United States Patent [19]

Heinrich et al.

[11] Patent Number: 4,471,286
[45] Date of Patent: Sep. 11, 1984

[54] CLOSED-LOOP FREQUENCY REGULATED GENERATOR APPARATUS

[75] Inventors: Theodore M. Heinrich, Murrysville, Pa.; Shan C. Sun, Pompano Beach, Fla.; Eugene L. Rodgers, Monroeville, Pa.

[73] Assignee: Westinghouse Electric Corp., Pittsburgh, Pa.

[21] Appl. No.: 367,143

[22] Filed: Apr. 9, 1982

[51] Int. Cl.³ .......................... H02P 9/00; H02P 9/42
[52] U.S. Cl. ........................................ 322/29; 322/32; 324/78 E; 328/134
[58] Field of Search ............... 328/66, 155, 167, 133, 328/134, 78 E, 79 R, 99 R; 322/17-21, 25, 28, 322/29, 32; 307/108, 271, 517, 525-527; 318/314, 318/318

[56] References Cited

U.S. PATENT DOCUMENTS

| | | | |
|---|---|---|---|
| 3,521,084 | 7/1970 | Jones | 328/133 X |
| 3,553,596 | 1/1971 | Thompson et al. | 328/133 X |
| 3,780,297 | 12/1973 | Geary | 324/78 E UX |
| 3,839,673 | 10/1974 | Acker | 324/78 E |
| 4,082,998 | 4/1978 | Marriott | 324/99 D |
| 4,289,974 | 9/1981 | Katunin et al. | 307/527 |
| 4,322,630 | 3/1982 | Mezera et al. | 307/87 X |
| 4,380,746 | 4/1983 | Sun et al. | 328/66 X |
| 4,399,397 | 8/1983 | Kleinschmidt, Jr. | 322/20 X |

Primary Examiner—R. J. Hickey
Attorney, Agent, or Firm—C. M. Lorin

[57] ABSTRACT

In a motor-generator set, the frequency of the AC generator outputted voltage is automatically adjusted by field winding regulation of the DC motor, through a closed loop in which a dual-slope converter is charged during a clock-defined time interval in accordance with a potentiometer setpoint, and the charging plus discharging period of the dual slope converter encompasses the period of the outputted voltage.

6 Claims, 4 Drawing Figures

CLOSED-LOOP FREQUENCY REGULATED GENERATOR APPARATUS

BACKGROUND OF THE INVENTION

The present invention relates to apparatus for the regulation of speed and frequency, in general, and more particularly to uninterruptible power supply (UPS) motor drives and/or electrical generators operable at a fixed frequency.

The present invention will be described more specifically in the context of a motor-generator set in which a separately excited DC machine is coupled to a synchronous AC machine for the generation of AC current of a standard frequency, for instance, 60 Hertz. This type of generator is particularly suitable for the power supply of a ship where a DC power grid is available which needs to be tied to an AC power grid for interconnection with transfer of power in either direction. This is the situation encountered when a motor-generator set is used as a standby, which can, in an emergency, be introduced to provide auxiliary AC power at a fixed frequency on the AC grid, in the absence of any generator of sufficient capacity to impose a reasonably constant frequency all the time. The fixed frequency, for instance 60 Hertz, is maintained by adjusting the speed of the DC machine coupled to an AC generator which is a synchronous machine. The constancy in frequency of the generator thus depends upon the degree of accuracy in the speed regulation of the motor. Frequency adjustment is obtained with a frequency representative feedback signal compared with a speed reference signal to compensate for any error.

Two approaches have been used in the past to generate such a feedback signal. One has been to convert frequency into voltage. The frequency to voltage (F/V) converter then becomes a crucial element in achieving regulation with accuracy. Any error introduced by the F/V converter cannot be corrected by the closed loop regulator. This raises a problem when the implementation of a F/V converter requires various inductor-capacitor networks, since they are difficult to manufacture with a high degree of accuracy and are sensitive to temperature.

Another approach has been to make use of an accurate time base, such as provided by a crystal oscillator, to measure the period of the AC line, e.g., the inverse of the frequency. However, when so doing, the prior art has used digital techniques requiring signal conversion into analog for the purpose of comparison with the AC period. Here also, like with the frequency-to-voltage converter, the digital-to-analog converter is a source of error.

The present invention allows for the use in a closed-loop of both analog reference setting and analog feedback, while taking advantage of digital techniques.

SUMMARY OF THE INVENTION

The present invention makes use of a dual slope converter to derive the error in frequency. The measurement cycle is defined by the time period of the AC output to be regulated and the accumulated charge is obtained by integration in relation to the regulation setpoint under a precise time interval. Advantage is taken of the fact that any variation, or drift, affecting the gain during the charging step is automatically compensated during the discharging step of the dual slope converter.

DESCRIPTION OF THE PREFERRED EMBODIMENT

Figure 1:
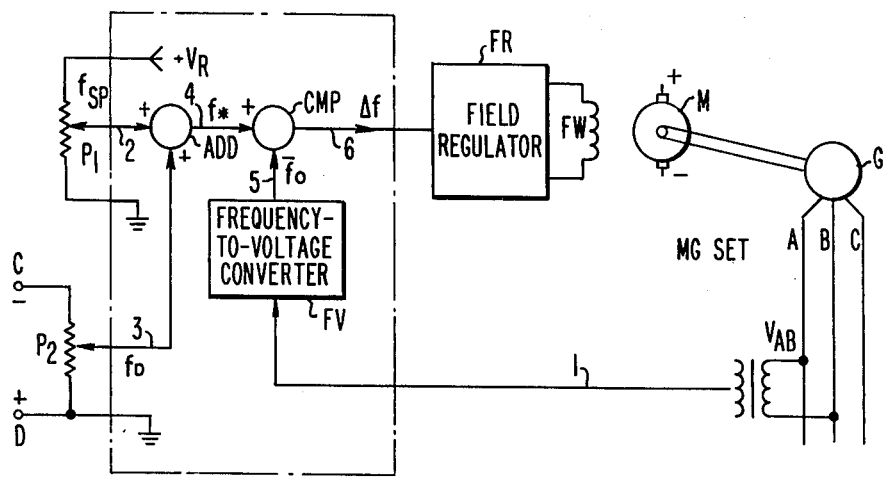
FIG. 1 shows a speed regulator system for a motor-generator set according to the prior art using a frequency-to-voltage converter.

Referring to FIG. 1, at a location remote from the motor-generator set MG, potentiometers $P_1$ and $P_2$ are used to adjust the setpoint for a frequency regulator FR controlling the field winding FW of a DC motor M driving a synchronous generator G. From the three-phase output lines (A, B, C) of the generator is derived the line-to-line voltage $V_{AB}$ and such feedback signal is applied on line 1 to a frequency-to-voltage (F/V) converter, FV outputting on line 5 a frequency representative signal (frequency $f_0$). Potentiometer $P_1$ under a potential source $V_R$ provides a frequency setpoint ($f_{sp}$) signal applied from the moving arm on line 2 to the adder ADD. Potentiometer $P_2$ under a voltage between its two ends C, D, which represents real power, provides a droop characteristic signal ($f_D$) which is applied from the moving arm on line 3 to the adder ADD. The resulting combined signal ($f_*$) on line 4 is used as a reference frequency signal. The signals of lines 5 and 4 are compared by a subtracter CMP to generate an error signal $\Delta f$ on line 6 to the field regulator FR, e.g., the frequency error signal of line 6 will drive the field regulator to determine the output frequency in relation to the setpoint reference of line 4. However, any error inherent in the operation of F/V converter FV will affect the magnitude of the $f_0$ signal of line 5 which otherwise should be proportional to the output frequency.

Figure 2:
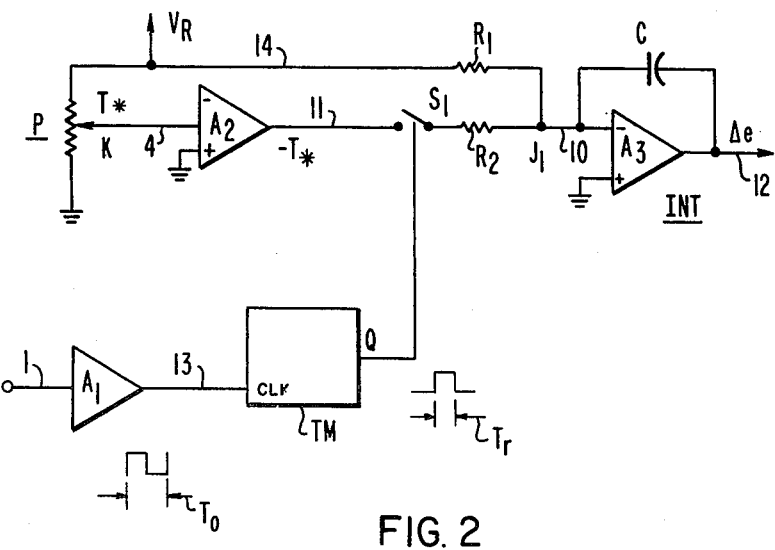
FIG. 2 provides a schematic representation of the circuit used according to the present invention for the derivation of a corrective control signal in the speed regulator system.

Referring to FIG. 2, it is now proposed to generate an error signal shown as $\Delta f$ on line 6, without the use of a frequency signal, while taking advantage of a precise time signal, such as obtained with a crystal oscillator, to relate the amplitude of the correction signal to the period of the AC output. This is achieved with a dual slope converter typified in FIG. 2 by an integrator INT and a time basis circuit providing a charging time and a discharging time for the integrator which are determined by a timer TM. The charging time defined by the timer is $T_r$ provided by a precision one-shot multivibrator, e.g., a crystal oscillator, and $T_r$ is controlling switch $S_1$ applying to the integrator during such time $T_r$ a signal derived from the setpoint potentiometer P which is analogous in FIG. 2 to the two potentiometers $P_1$, $P_2$ combined of FIG. 1. The signal of line 4 from potentiometer P is inverted by a unity gain operational amplifier $A_2$ and the outputted negative signal on line 11 is passed by switch $S_1$ via a resistor $R_2$ onto the inverting input of the operational amplifier $A_3$ of the integrator INT. Amplifier $A_3$ includes a capacitor C between output and input as generally known and which according to the present invention is charged during $T_r$ and discharged during $(T_0-T_r)$, as illustrated by curve (c) of FIG. 4 hereinafter. If the integral of the setpoint signal magnitude on line 11, weighted by resistor $R_2$, applied during fixed time interval $T_r$ matches exactly the integral of the signal on line 14, weighted by resistor $R_1$, applied during time interval $(T_0-T_r)$, capacitor C is totally discharged at the end of $T_0$. Otherwise it will either not be completely discharged and a remaining positive charge will be detected at the output 12 of the integrator, or it will have come, negatively, past the discharging cross-over point and a negative voltage will be detected at the output 12. The error voltage represents a period error $(T_0'-T_0)=\Delta T$ which is a frequency error to be compensated by the field regulator FR (see FIG. 1) in order to match the controlling setpoint signal of line 4.

The determination of $(T_0-T_r)$ is obtained, as shown by FIG. 2, by applying a time interval $T_0$ characteristic of the period and defined between cross-over points of the AC wave on line 1 detected by a pulse shaper symbolized in FIG. 2 by an amplifier $A_1$. Times $T_r$ and $T_0$ are initiated at the same instant, $T_r$ being defined by clocking from amplifier $A_1$ the one-shot multivibrator of timer TM synchronously with the occurrence of a crossover point. During time $T_r$ switch $S_1$ is closed and amplifier $A_3$ sees a net negative input signal on line 10, which is the sum of the negative setpoint signal on line 11, weighted by resistor $R_2$, and a signal due to the positive potential source $V_R$ on line 14 weighted by resistor $R_1$. Resistor $R_2$ is chosen to be substantially smaller than $R_1$ so that the input from line 11 predominates over the effect of source $+V_R$. When, however, switch $S_1$ is open, only the positive potential source $V_R$ via resistor $R_1$ is effective, thereby initiating a discharging step for integrator INT. Such discharging step will last until period $T_0$ has expired, namely, when another cross-over point from line 13 will short-circuit the integrator and trigger another time period $T_r$.

At the moment $T_0$ expires, the dual slope converter of FIG. 2 will sample and hold any error appearing on line 12 and will quickly reset capacitor C to zero, thereby preparing for another charging-discharging cycle. Assuming integrator INT has been zeroed initially, the output after one line period $T_0$ is a voltage $\Delta e$ such that $$\Delta e = \frac{k V_R \cdot T_r}{R_2 C} - \frac{V_R \cdot T_0}{R_1 C} \quad (1)$$

where k is a coefficient defining the setting of potentiometer P.

When the setting of P matches $T_0$, e.g., the frequency, the integrator output is zero and equation (1) becomes $$T_0 = \left(\frac{R_1}{R_2}\right) \cdot k \cdot T_r \quad (2)$$

The gain of the detector is the derivative of equation (1) with respect to $T_0$. Then, $$\frac{d\Delta e}{dT_0} = -\frac{V_R}{R_1 C} \quad (3)$$

From equation (1) it appears that any variation of $V_R$ will affect equally both sides of the subtraction, therefore will not affect $\Delta e$. This is a well known advantage of the dual slope converter.

Equation (2) indicates that the setpoint stability i.e., the regulating point with potentiometer $P_1$, depends only on the ratio of $R_1/R_2$, the pulse width $T_r$ of the precision one-shot multivibrator used in timer TM, and the desired setpoint k. All these can be made stable very easily. Equation (3) shows that the gain of the dual slope converter depends upon C and the supply voltage. Even if these quantities vary somewhat more than $T_r$ and $R_1/R_2$, this will not seriously affect the measurement $\Delta e$, because gain variation is not as crucial as setpoint variation.

The output of the integrator must be sampled and held when $T_0$ expires and the integrator must be reset for the next line cycle very quickly.

Figure 3:
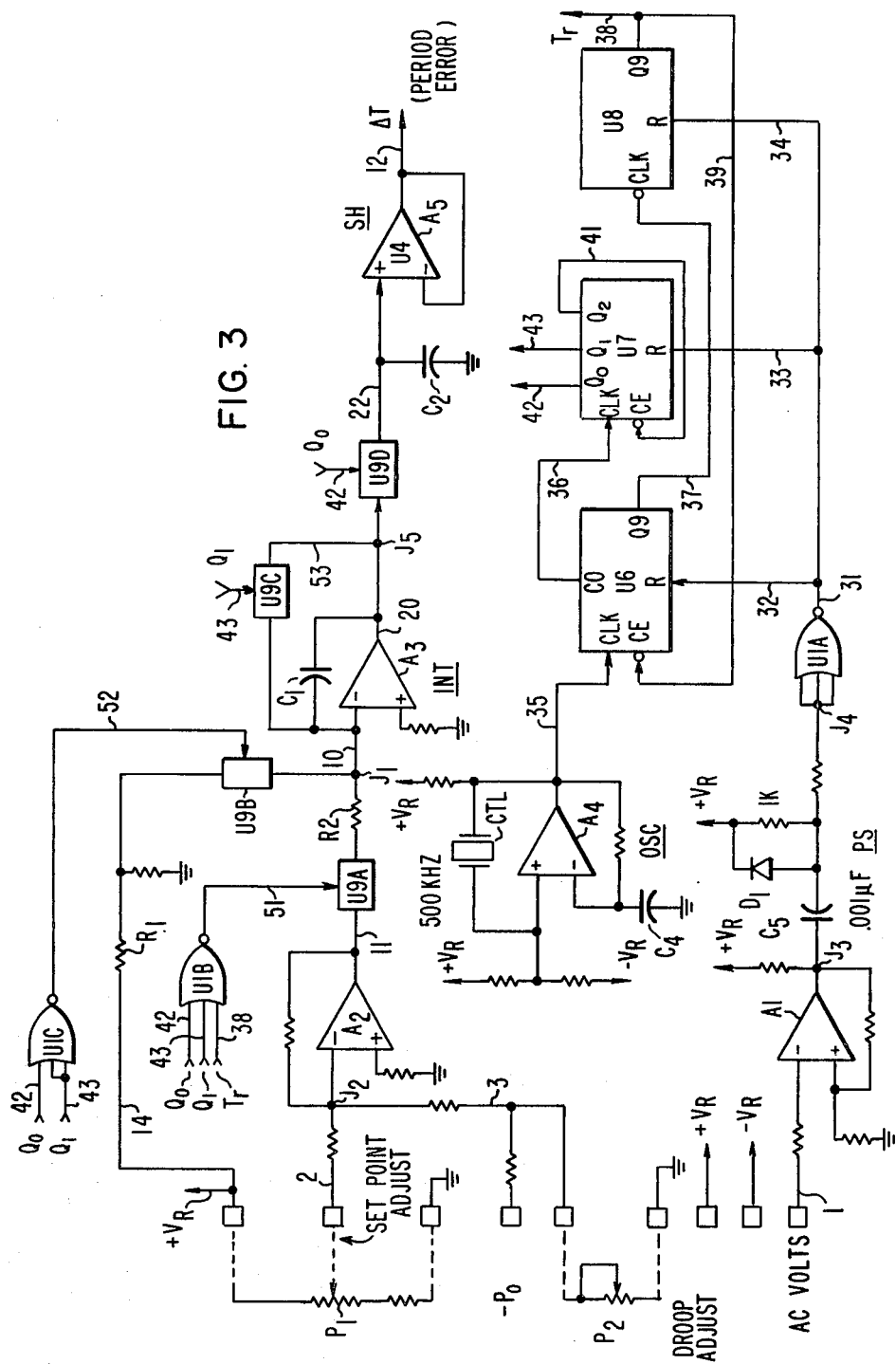
FIG. 3 is a diagram illustrating with electrical components the circuit according to a preferred implementation of the invention.

Referring to FIG. 3, the implementation of the invention is illustrated with hybrid analog-digital circuitry, as follows.

Figure 4:
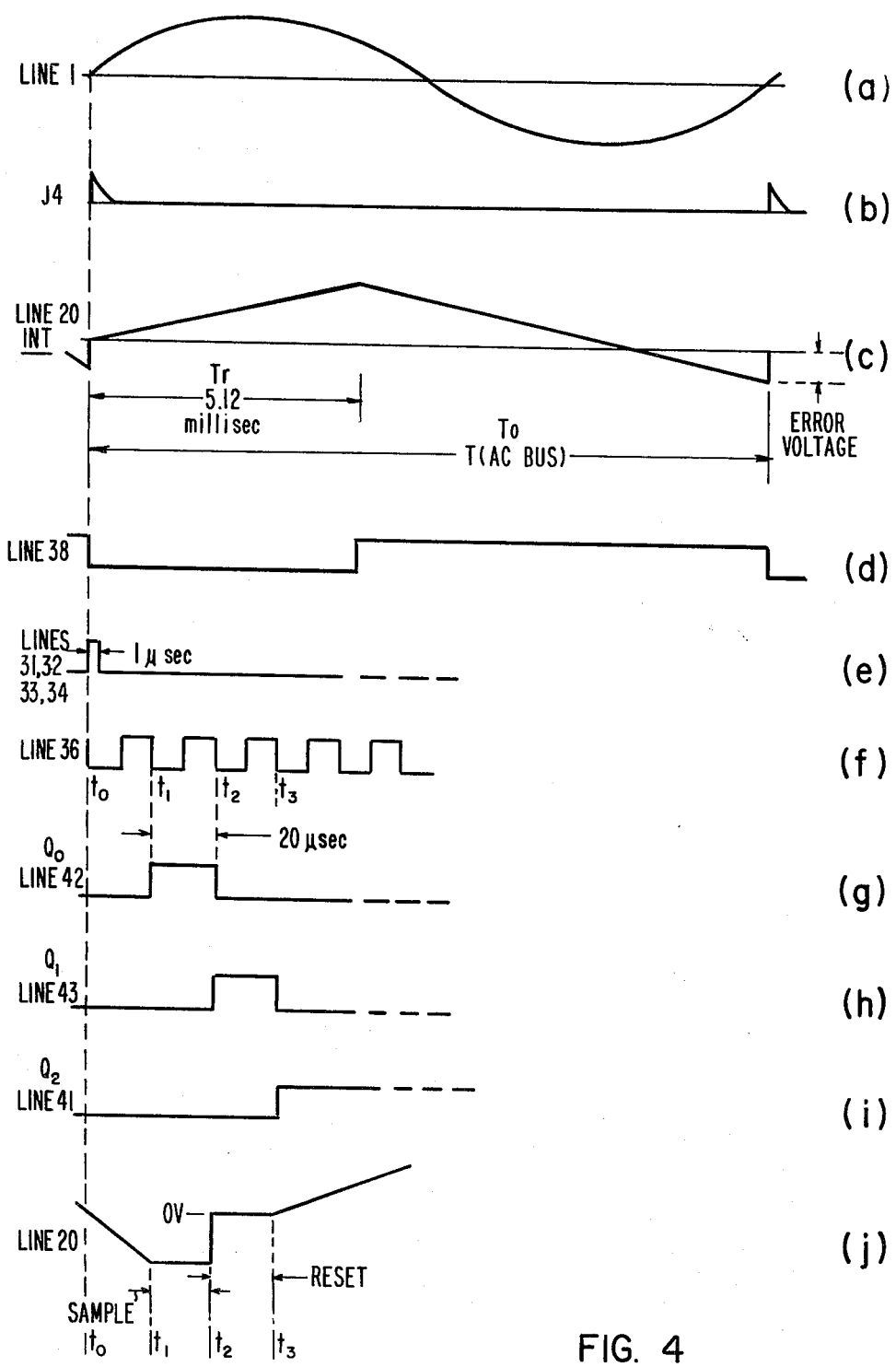
FIG. 4 groups curves explaining the operation of the circuit of FIG. 3.

The time interval $T_0$ between two consecutive zero-crossings in the same direction is identified by two successive reset pulses from lines 31 to 34 (see curve (e) of FIG. 4). Each reset pulse terminates the current time interval $T_0$ ad initiates both the fixed time interval $T_r$ and the next time interval $T_0$ (see curves (c) and (d) of FIG. 4). The control signal $T_r$ is generated by counter U8 which, when clocked by line 37 from counter U6, initiates $T_r$, and by line 39 disables itself immediately following $T_r$. U8 remains disabled until reset by line 34 at the end of $T_0$. As long as the signals of lines 38, 44, 47 are zero the setpoint voltage of line 11 weighted by resistor $R_2$ acts, by switch U9A to modify the charging rate of the integrator. Switch U9A is gated ON by NOR device U1B which responds on lines 47, 44 and 38 to respective signals $Q_0$, $Q_1$ and $T_r$. The output of U1B, line 51, is a ONE when neither line at the input has a ONE. During $T_r$ line 38 has a zero. During time $T_r$ the reference voltage $V_r$ on line 14 weighted by resistor $R_1$ acts through switch U9B to modify the charging rate of the integrator. Switch U9B is gated on by NOR device U1C which responds on lines 42 and 43 to signals $Q_0$ and $Q_1$, respectively. Time $T_r$ is the charging period of the integrator when capacitor C is charging up except during time intervals $(t_1, t_2)$ and $(t_2, t_3)$ when $Q_0$ and $Q_1$ have a ONE, respectively (see curves c, f, e, j).

The carryout signal of line 36 from counter U6 is applied to the clock pin of another counter U7, outputting on line 42 at its $Q_0$ output a square pulse of 20 microseconds duration. Counter U7 generates on line 43 at its $Q_1$ output a square pulse of 20 microseconds immediately following the end of the square pulse of $Q_0$, and by line 41 from its pin $Q_2$, counter U7 disables itself immediately following $Q_1$. Time interval defined by $Q_0$ is used to sample the error outputted by the integrator, whereas the consecutive time interval defined by $Q_1$ is used to reset the integrator. Sampling is achieved by applying the signal $Q_0$ of line 42 to the gate pin line 46 of switch U9D in line 22 to the sample and hold device $A_5$. Resetting is performed by applying the signal $Q_1$ of line 43 to the gate pin line 43 of switch U9C, thereby shortcircuiting the connection between output junction $J_5$ and input junction $J_1$ of the integrator $A_3$.

From setpoint potentiometer $P_1$ and from droop adjust potentiometer $P_2$, lines 2 and 3, respectively, join at $J_2$ on the inverting input of an operational amplifier $A_2$ providing on line 11 an inverted signal which is used to charge, via resistor $R_2$ and line 10 the integrator INT once switch U9A has been closed. Positive potential source $V_R$ by line 14 is applied via resistor $R_1$ to the same inverting input of $A_2$, at junction $J_1$ with line 10, provided switch U9B is closed. The integrator built around operational amplifier $A_3$ outputs on line 20 a voltage signal representative of the charge on capacitor $C_1$, connecting output junction $J_5$ to input junction $J_1$. Capacitor $C_1$ is reset to zero when short circuited between $J_5$ and $J_1$ by switch U9C. The output of the integrator is passed from line 20 to line 22 at the non-inverting input of a sample and hold operational amplifier $A_5$, provided switch U9D is closed between line 20 and line 22 to set capacitor $C_2$ to the voltage of $J_5$. The sampled error $\Delta T$ is outputted on line 12.

The AC line voltage feedback on line 1 is applied to a cross-over detector comprising a squarer built around a comparator operational amplifier $A_1$ and a pulse-shaper PS comprising: a differentiating capacitor $C_5$ (value 0.001 $\mu f$) in line at the output; a source ($+V_R$) applied via the parallel network of a diode $D_1$ and a resistor (1 k$\Omega$); and a NOR device U1A. The input to $A_1$ is a heavily filtered sample of the AC bus voltage. Each time there is a cross-over in the same direction, a 1 $\mu$s digital pulse will appear on line 31 at the output of NOR device U1A. Each pulse is one period apart, e.g., $T_0$ away. A crystal oscillator OSC built around an operational amplifier $A_4$ with a crystal CTL of a period of 500 kHertz generates on line 35 a series of clock pulses which are 2 $\mu$s apart. The clock signal is applied by line 35 to the clock pin of a decade counter U6 which begins to count on the next positive clock pulse following each reset pulse applied by lines 31 and 32 to its R pin. The clock crystal oscillator (CTL) frequency of 500 Hz provides a maximum 2 $\mu$s time duration from the end of the reset pulse on line 32 to the start of counter U6. This minimizes the variation in $T_0$ due to the lack of synchronization of the crystal oscillator with the line frequency. Counter U6 having effected a divide by 10 operation on the clock signal of line 35, the clock signal on line 36 has a 20 microsecond period.

The time interval $T_0$ between two consecutive zero-crossings in the same direction is detected by the zero-crossing detector generating on lines 31-34 successive pulses applied to the reset pin of counters U6, U7 and U8 (see curve (b) of FIG. 4). Each pulse initiates both the fixed time interval $T_r$ generated by counter U8, which resets itself at the end of $T_r$ by line 39, and the period characterizing time interval $T_0$ which is generated by the combination of counters U6, U7. The reset pulse also indicates the termination of time interval $T_0$ (see curves (c) and (d) of FIG. 4).

In contrast with the prior art, the dual slope converter according to the present invention is not used as a measuring instrument. The detected error of line 12 (see curve (c) of FIG. 4) is applied to a frequency corrective circuit which is part of the closed loop in which the dual slope converter is inserted. An operator reads on a frequency meter the actual frequency outputted by the system and manually adjusts the setpoint on potentiometer $P_1$ until the error of line 12 has led to the correct frequency, typically 60 Hertz. Once this is achieved, the error on line 12 has been nullified and the duration $T_0$ matches exactly the desired frequency imposed by the setpoint.

Accordingly, the dual slope converter is modified in order that the conventional sample and hold, as well as resetting steps, do not interfere with the closed loop control operation. Therefore, referring to FIG. 4 and curve (j) the steps of detection and zeroing of the error signal dT of line 12 are taken at a precise occurrence after the occurrence of the cross-over point ($t_0$) of the line frequency signal, line 1, typically after one counting period has lapsed after triggering of switch U6, namely, when the time interval defined by $Q_0$, e.g., ($t_1$-$t_2$) of line 42 is initiated. As a result, due to the added time in discharging C, the error which occurs at time $t_0$ is somewhat in want (if the error is positive) or in excess (if the error is negative). However, the charging step is initiated at time $t_3$ at the end of another counting period defined by switch U7 on line 43, thus, after a total delay defined by $Q_0$ and $Q_1$, e.g., ($t_1$-$t_3$). This delay, which adds up the sampling and reset periods, extends between the discharging step (ending at $t_1$) and the charging step (starting at $t_3$). It is taken up from the true period $T_0$ which determines the error dT of line 13. This measurement error, though, by reducing somewhat the charging time is in the opposite direction relative to the earlier mentioned measurement error due to time interval $t_0$-$t_1$, which makes the discharge step somewhat longer. Accordingly, these measurement errors compensate each other to a certain extent. Moreover, each of these time intervals ($t_0$-$t_1$), ($t_1$-$t_2$) and ($t_2$-$t_3$) are of the order of 20 microseconds, whereas the charging time is of the order of 5 milliseconds, and the total time $T_0$ is about 16 milliseconds (for 60 Hertz). Therefore, the value of dT on line 12 is only very slightly affected. This is an extremely small discrepancy in the operation of the dual slope converter, which is a small price to pay for accuracy in using $T_r$ and $T_0$ for closed-loop control since, as opposed to the conventional use of a dual slope converter as an error measurement device, this is the contemplated field of application of the invention.

Referring to FIG. 4, when OSC circuit generates pulses which are 2 $\mu$s apart, counter U6 effects a division by 10, and counter U8 effects division by 256, which leads to pulses on line 38 which are 5.12 milliseconds apart. With an integrator including a capacitor C of 0.022 microfarad and resistors $R_1 = 267K$ and $R_2 = 150K\Omega$, the time constant is such that for the setpoint chosen for 60 Hertz, it takes 16.67 milliseconds to charge and discharge completely the capacitor since $T_0$ corresponds to 60 Hertz, e.g., 16.67 milliseconds exactly. Actually as earlier mentioned, the total time $T_0$ is not used in the process, since a time ($t_1$-$t_2$) or ($t_2$-$t_3$) of 20 microseconds is taken out, while discharging is postponed by 20 microseconds ($t_0$-$t_1$) and charging is also postponed by 20 microseconds, e.g., ($t_2$-$t_3$) or ($t_1$-$t_2$). The charging period is defined by line 38 during $T_r$ when the signal of line 38 is a zero, when $Q_0$ is a zero on line 42 and $Q_1$ also is a zero on line 43, whereby NOR device U1B causes U9A to be closed and NOR device U1C causes U9B to be closed applying both the setpoint voltage line 11 and the reference voltage line 14 to the integrator.

The discharging period is initiated when $T_r$ has expired and the signal of line 38 has become a ONE thereby causing switch U9A to disconnect. At the end of $T_0$ junction $J_1$ is disconnected from the potential source $V_R$ by switch U9B, when either $Q_0$ or $Q_1$ is a ONE. Discharging is terminated not at $t_0$ but at $t_1$ when the start of $Q_1$ (end of the $T_0$) causes, at time $t_1$, switch U9D to be closed, at the input of the sample and hold circuit SH, for 20 microseconds ($Q_0$, from $t_1$ to $t_2$). Then, the error dT of line 12 causes process control action to change $T_0$. Capacitor C is short-circuited when $Q_1$ on line 43 so controls switch U9C. Time $T_r$, though, is not applied to the dual slope converter until time intervals $t_0$-$t_1$, $t_1$-$t_2$ and $t_2$-$t_3$ have expired, namely when $T_r$ is defined by a zero into NOR device U1B on line 38 and zeroes at the inputs of NOR devices U1B and U1C on line 42 ($Q_0$) and line 43 ($Q_1$).

The solid state devices shown in FIG. 3 are illustrated as follows:

U1A, U1B, U1C are 4025B 3-input NOR gate devices;
U6 and U7 are 4017B series logic decade counters;
U8 is a 14-stage 4020 ripple carry binary counter;
U9A, U9C, U9D are CMOS gates 4066B quad bilateral switches;
$A_1$, and $A_4$ are LM139 operational amplifier devices used as comparators A5, A2 and A3 are LM108A operational amplifier devices.

We claim:

1. A closed-loop control apparatus for generating a control signal in response to a discrepancy between a feedback actual frequency representative signal and a desired frequency setpoint signal, comprising:

means for converting said feedback signal into successive pulses defining a time interval $T_0$ representative of the period of said actual frequency;

clock means for establishing a predetermined time interval $T_r$ smaller than $T_0$ upon initiation by said successive pulses;

dual slope converter means operated in a charging mode in response to said setpoint signal during said predetermined time interval and operated in a discharging mode during the remainder ($T_0$-$T_r$) of said period $T_0$;

said control signal being outputted by said dual slope converter means as a result of a discrepancy between the period assigned by said setpoint signal and said actual period.

2. The closed-loop control apparatus of claim 1 with said dual slope converter means including means responsive to said clock means for establishing a third predetermined time interval ($t_1$-$t_2$) for deriving said control signal at the end of a discharging mode operation; and means responsive to said clock means for establishing a fourth predetermined time interval ($t_2$-$t_3$) for resetting said dual slope converter means back from a discharging mode into a charging mode;

said third and fourth predetermined time intervals following each other and occurring during said second predetermined time interval;

said first and second time intervals being substantially larger than said third and fourth time intervals.

3. The apparatus of claim 2, with said third time interval being initiated a fifth predetermined time interval, in accordance with said clock means, following the occurrence of one of said successive pulses.

4. A closed loop frequency regulated motor-generator system including a synchronous alternating current AC generator coupled with a direct current DC motor having a field winding, the combination of:

a closed-loop control apparatus for generating a control signal in response to a discrepancy between a feedback actual frequency representative signal and a desired frequency setpoint signal, comprising:

means for converting said feedback signal into successive pulses defining a time interval $T_0$ representative of the period of said actual frequency;

clock means for establishing a predetermined time interval $T_2$ smaller than $T_0$ upon initiation by said successive pulses;

dual slope converter means operated in a charging mode in response to said setpoint signal during said predetermined time interval and operated in a discharging mode during the remainder ($T_0$-$T_r$) of said period $T_0$;

said control signal being outputted by said dual slope converter means as a result of a discrepancy between the period assigned by said setpoint signal and said actual period;

with said dual slope converter means including means responsive to said clock means for establishing a third predetermined time interval ($t_1$-$t_2$) for deriving said control signal at the end of a discharging mode operation; and means responsive to said clock means for establishing a fourth predetermined time interval ($t_2$-$t_3$) for resetting said dual slope converter means back from a discharging mode into a charging mode;

said third and fourth predetermined time intervals following each other and occurring during said second predetermined time interval;

said first and second time intervals being substantially larger than said third and fourth time intervals;

with said actual frequency representative signal being derived from said synchronous alternating current AC generator;

with said control signal controlling said field winding of said direct current DC motor coupled with said AC generator;

with said setpoint signal being defined in relation to the intended speed of said AC generator;

said control signal being derived in relation to an error generated by said dual slope converter means.

5. The system of claim 4 with a potentiometer having a moving arm; with a first switch turned ON during said third time interval for the charging mode; with a second switch turned ON during the remainder of said second time interval for the discharging mode to apply to the operative input of said dual slope converter means a discharging potential, said setpoint being defined by the moving arm of said potentiometer and connected to the operative input of said dual slope converter means through said first switch.

6. The system of claim 5 with another potentiometer having a moving arm, said set point combining the moving arm of said one potentiometer and the moving arm of said another potentiometer, said another potentiometer adding a droop characteristic to the moving arm of said one potentiometer.

* * * * *